United States Patent
DeAngelis

(10) Patent No.: US 11,593,282 B2
(45) Date of Patent: Feb. 28, 2023

(54) DUAL MEMORY SECURE DIGITAL (SD) CARD AND SYSTEM AND METHOD FOR WIRELESSLY AND AUTOMATICALLY UPDATING DATA IN HOST COMPUTER USING DUAL MEMORY SD CARD

(71) Applicant: Francesco E DeAngelis, Herndon, VA (US)

(72) Inventor: Francesco E DeAngelis, Herndon, VA (US)

(73) Assignee: Francesco E. DeAngelis, Herndon, VA (US)

( * ) Notice: Subject to any disclaimer, the term of this patent is extended or adjusted under 35 U.S.C. 154(b) by 80 days.

(21) Appl. No.: 17/318,286

(22) Filed: May 12, 2021

(65) Prior Publication Data
US 2021/0357338 A1 Nov. 18, 2021

Related U.S. Application Data

(60) Provisional application No. 63/023,356, filed on May 12, 2020.

(51) Int. Cl.
*G06F 13/38* (2006.01)
*G06F 13/16* (2006.01)
*B64D 43/00* (2006.01)

(52) U.S. Cl.
CPC ......... *G06F 13/1668* (2013.01); *B64D 43/00* (2013.01)

(58) Field of Classification Search
CPC .............................. G06F 13/1668; B64D 43/00
See application file for complete search history.

(56) References Cited

U.S. PATENT DOCUMENTS

| 8,666,924 | B2 * | 3/2014 | Hanson | H04L 69/22 706/47 |
| 9,060,202 | B2 * | 6/2015 | Mondragon | H04N 21/41265 |
| 10,146,557 | B2 * | 12/2018 | Jung | G06F 9/4401 |
| 10,854,263 | B2 | 12/2020 | Her et al. | |
| 10,856,350 | B2 | 12/2020 | Qiu et al. | |
| 10,866,798 | B2 * | 12/2020 | Nolan | G06F 8/654 |

(Continued)

FOREIGN PATENT DOCUMENTS

CN  107357601 A * 11/2017
CN  109117168 A * 1/2019

(Continued)

*Primary Examiner* — Cheng Yuan Tseng
(74) *Attorney, Agent, or Firm* — Ked & Associates

(57) ABSTRACT

A dual memory Secure Digital (SD) card is provided which allows for remote data updates without disruption to a currently executing program, as well as a system and method that utilize the dual memory SD card. The dual memory SD card may include a primary memory, an independent secondary memory, and a microcontroller or Application Specific Integrated Circuit (ASIC) that can load either memory upon boot up of a host computer. The dual memory SD card may also include a wireless interface, such as Wi-Fi or Bluetooth, in addition to a standard SD pin interface. An automated data synchronization system is provided which allows a new version of data to be uploaded onto the secondary memory of the dual memory SD card while an existing data version is running on that same dual memory SD card and swapped into operation upon the next reboot of a host device.

14 Claims, 9 Drawing Sheets

(56) References Cited

U.S. PATENT DOCUMENTS

| | | | | |
|---|---|---|---|---|
| 11,301,347 B2 * | 4/2022 | Bujan | ................... | G06F 8/654 |
| 2013/0305238 A1 * | 11/2013 | Frayssignes | .............. | G06F 8/65 |
| | | | | 717/173 |
| 2016/0216957 A1 * | 7/2016 | Yoon | ..................... | G06F 8/654 |
| 2016/0378511 A1 * | 12/2016 | Jung | ..................... | G06F 3/067 |
| | | | | 713/2 |
| 2017/0060567 A1 * | 3/2017 | Kim | ..................... | H04L 41/082 |
| 2021/0345076 A1 * | 11/2021 | Lee | .................. | H04W 52/0261 |

FOREIGN PATENT DOCUMENTS

| | | | | | |
|---|---|---|---|---|---|
| CN | 110990044 | A | * | 4/2020 | |
| CN | 108089876 | B | * | 9/2020 | .......... G06F 11/1004 |
| DE | 102016115545 | A1 | * | 3/2017 | ........... G06F 21/572 |
| DE | 102019106796 | A1 | * | 9/2020 | |
| JP | 2019003557 | A | * | 1/2019 | ............. G06F 13/10 |

* cited by examiner

DUAL MEMORY SECURE DIGITAL (SD) CARD AND SYSTEM AND METHOD FOR WIRELESSLY AND AUTOMATICALLY UPDATING DATA IN HOST COMPUTER USING DUAL MEMORY SD CARD

CROSS-REFERENCE TO RELATED APPLICATION(S)

This application claims priority to U.S. Provisional Application No. 63/023,356, filed on May 12, 2020, whose entire disclosure is hereby incorporated by reference.

BACKGROUND

1. Field

A dual memory Secure Digital (SD) card and a system and method for wirelessly and automatically updating data in a host computer using a dual memory SD card are disclosed herein.

2. Background

Secure Digital (SD) cards are used all over the world in electronic products (host devices) from cameras and cell phones to avionics platforms. The SD cards follow a defined standard put forth by the SD Card Association, which includes the physical form, physical pin interface, and software interface protocol. The SD cards contain a memory controller and a memory from which data is read and to which data is written. A host electronic device (hereinafter "host") connects to the SD card via the physical pin interface and communicates via the software interface protocol to read data from and write data to the memory. The host has access to the full memory of the SD card and can write data to or read data from anywhere in the memory.

There is a need in various applications and scenarios to update data in an SD card memory from an external source, that is, an external electronic device (hereinafter "external device") while the SD card is already communicating with a host which is reading data and writing data, such as updating flight and navigation databases in an avionics computer while an aircraft is operating. A number of techniques are provided in literature and in current products to update memory, but none address writing to a memory from an external device while that memory is already being accessed by a host.

U.S. Pat. No. 10,854,263, which is hereby incorporated by reference, discloses a novel SD design in which multiple memory blocks including a cache memory are used to speed up read/write transfers from the SD card to the host. Backup memory blocks are also described in which data can be recovered if it is lost from a primary memory block. This design has the potential to improve the speed and reliability of SD cards, but does not solve the problem of allowing data in a memory to be updated by an external device without corrupting the data, while the host is accessing the same memory.

Further, U.S. Pat. No. 10,856,350, which is hereby incorporated by reference, discloses a system that uses dual Subscriber Identity Module (SIM) cards as a way to establish connections between a device and two separate external devices. Each SIM card supports one connection with an external device independent of the other SIM card. Though this allows one device to communicate simultaneously with two other devices, this does not accomplish the goal of allowing a single SD card to have its memory updated by an external or secondary device while the host or primary device is accessing the memory.

Some SD cards, such as an iSDIO wireless LAN type, provide for a second interface, such as a Wi-Fi interface, to another external electronic device, in addition to the standard compliant pin interface for the host. These cards allow data to be read from and written to the single card memory from an external data source, but not during access of existing data by the host or the data can be corrupted in the shared memory. The memory controller will halt host communications, and perform data update of the single shared memory with the external device through the second interface. When finished with the data transfer, the memory controller halts communication with the second external device, then resumes communication with the host device and alerts the host that the memory has been updated so that the host can synchronize its internal data or files.

Map, regulation, and navigation data are included in flight databases and are required and used by pilots to plan and follow FAA procedures and guidelines throughout a flight. This data may be carried manually in paper form or in electronic form on a tablet computer, though on modern aircraft it is more typically loaded onto the flight computer via an SD Card or USB/Ethernet port. The pilot will load the latest databases onto the SD Card then insert the SD card into the flight computer where the new database files will be read to provide data to various avionics systems and displays. This process may also be done via portable computers through interface ports to the flight computer, such as an Ethernet or USB connection, by pilots or trained technicians.

These database updates occur approximately every month and are time and effort consuming for related personnel and pilots. The old databases are deleted while the new databases are manually copied onto the SD Card from a computer that has received the updated databases. Once updated on the SD card, the pilot or technician physically brings the SD card to the airplane and plugs the SD card into the avionics computer. Alternately, the pilot or technician connects his/her laptop or tablet to the avionics panel and manually copies the databases over. If the databases on an airplane are not updated in a timely manner, the pilot could be out of compliance with regulations.

An Aircraft Connectivity Module (ACM), such as an AirSync Bridge™, connects aircraft directly to the Internet allowing airplanes to send flight log data from their flight computers wirelessly to an Internet database upon landing. The logs are then distributed to various subscribed users and organizations. By the nature of its connection, the ACM provides the ability to operate in the other direction and load data from Internet databases onto the flight computer. The implementation of how flight databases are updated is the purpose of this disclosure.

BRIEF DESCRIPTION OF THE DRAWINGS

Embodiments will be described in detail with reference to the following drawings in which like reference numerals refer to like elements, and wherein.

DETAILED DESCRIPTION

A novel dual memory Secure Digital (SD) card according to an embodiment is disclosed here. Further, a system and method for wirelessly and automatically updating data in a host computer using a dual memory SD card are disclosed herein. As an example, the novel dual memory SD card, system, and method according to embodiments are shown implemented to wirelessly and automatically update flight data in an avionics computer (host computer) in an aircraft. However, embodiments are not limited thereto. For example, the novel dual memory SD card, system, and method according to embodiments may be utilized in other types of systems, such as a vehicle computer in an automobile or other vehicle, or an industrial computer running industrial equipment. In the case of an avionics computer (or avionics panel or flight computer) in an aircraft, the novel dual memory SD card, system, and method according to embodiments may be used to update flight data. The term "flight data" may refer to flight data and/or databases, including but not limited to, flight plans, navigation data, files, and/or databases, and/or flight logs, for example. The term "flight databases" may include data needed for flight, including but not limited to, flight plans, navigation data, maps, and/or rules and regulations, for example. The term "flight logs" may refer to flight records and/or data, including but not limited to, aircraft position data, fuel level data, and/or temperature and other type sensor and gauge data, for example.

Figure 1:
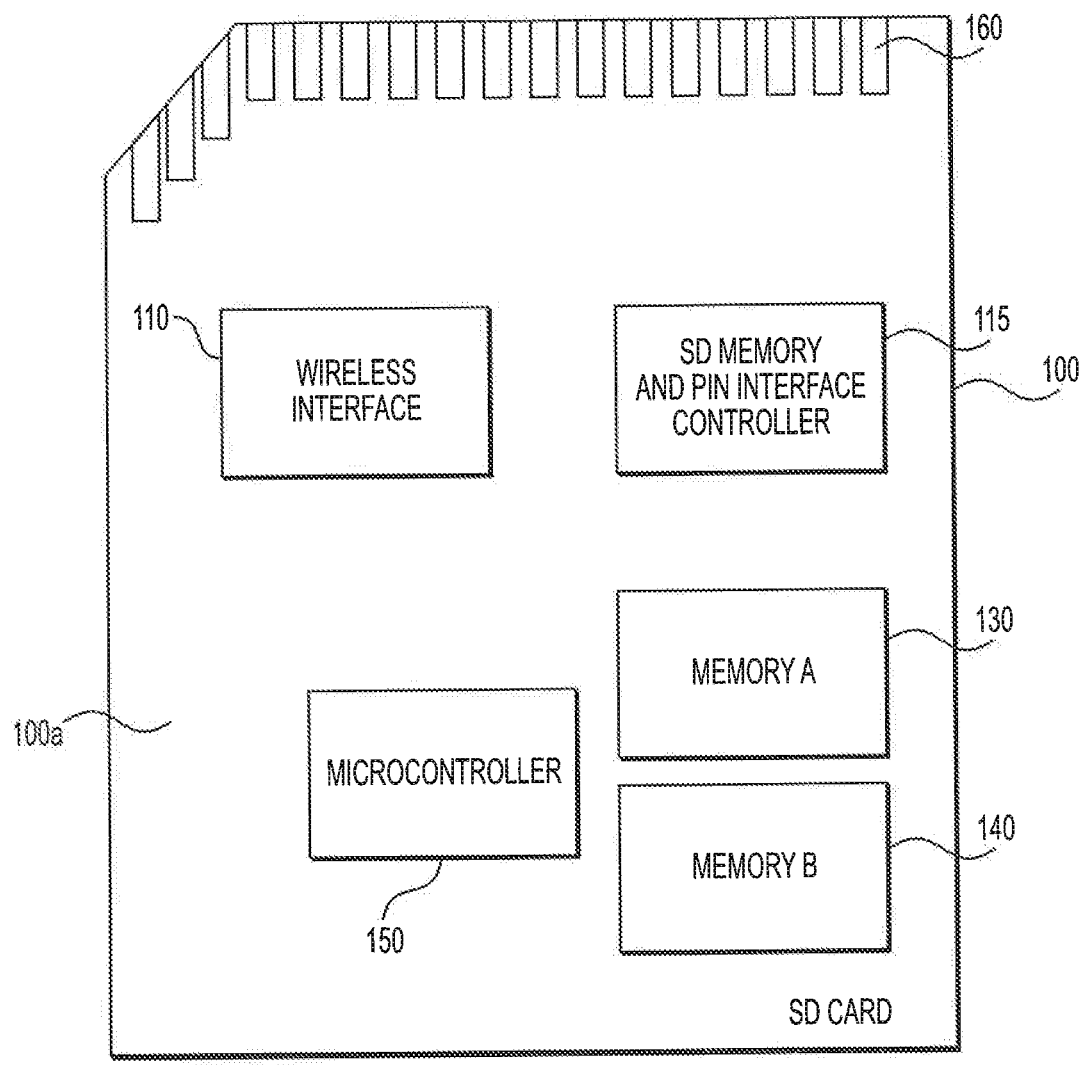
FIG. 1 is a schematic diagram of a dual memory SD card according to an embodiment.
Figure 2:
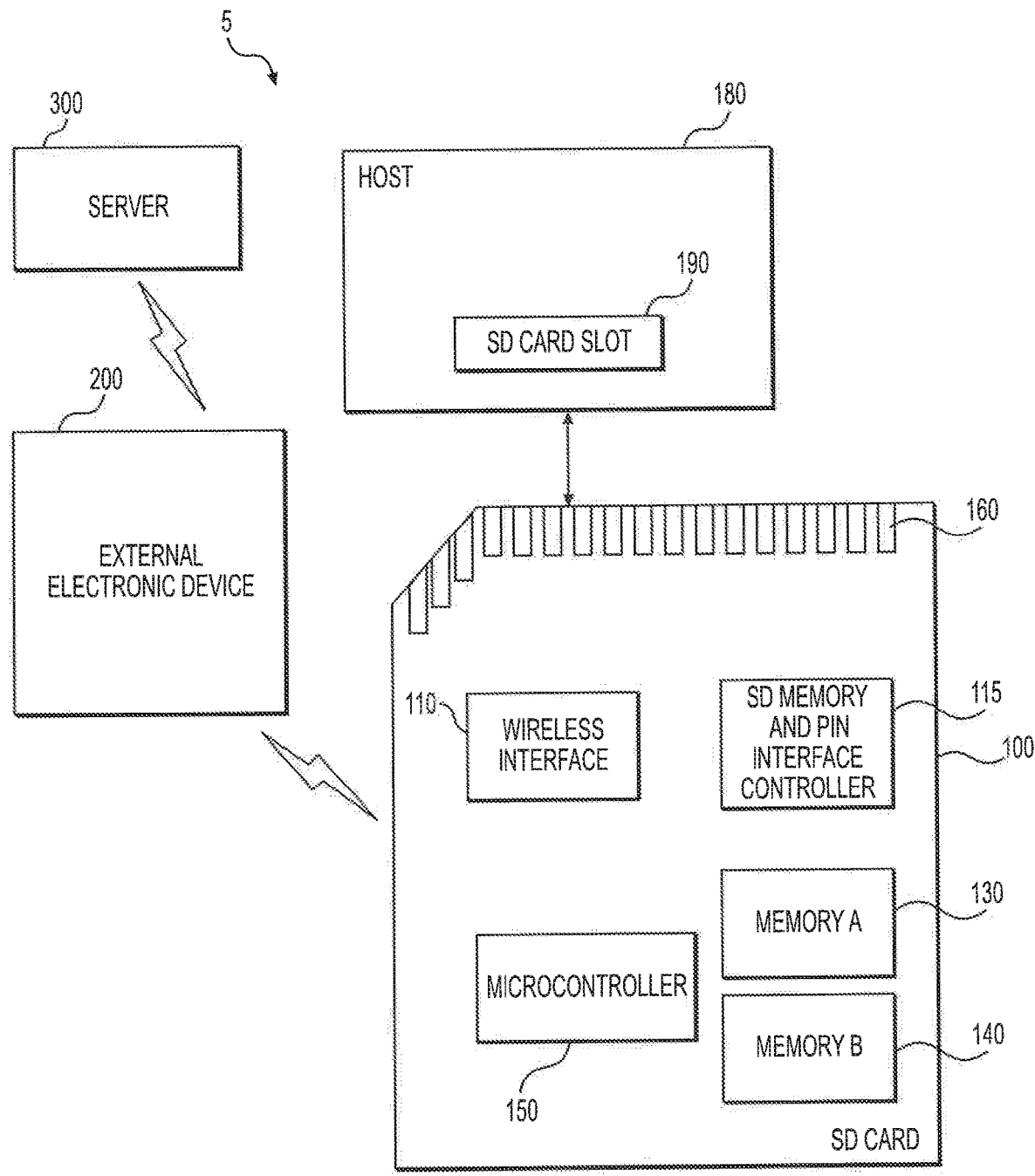
FIG. 2 is a schematic diagram of a system for updating flight data using a dual memory SD card according to an embodiment.
Figure 3:
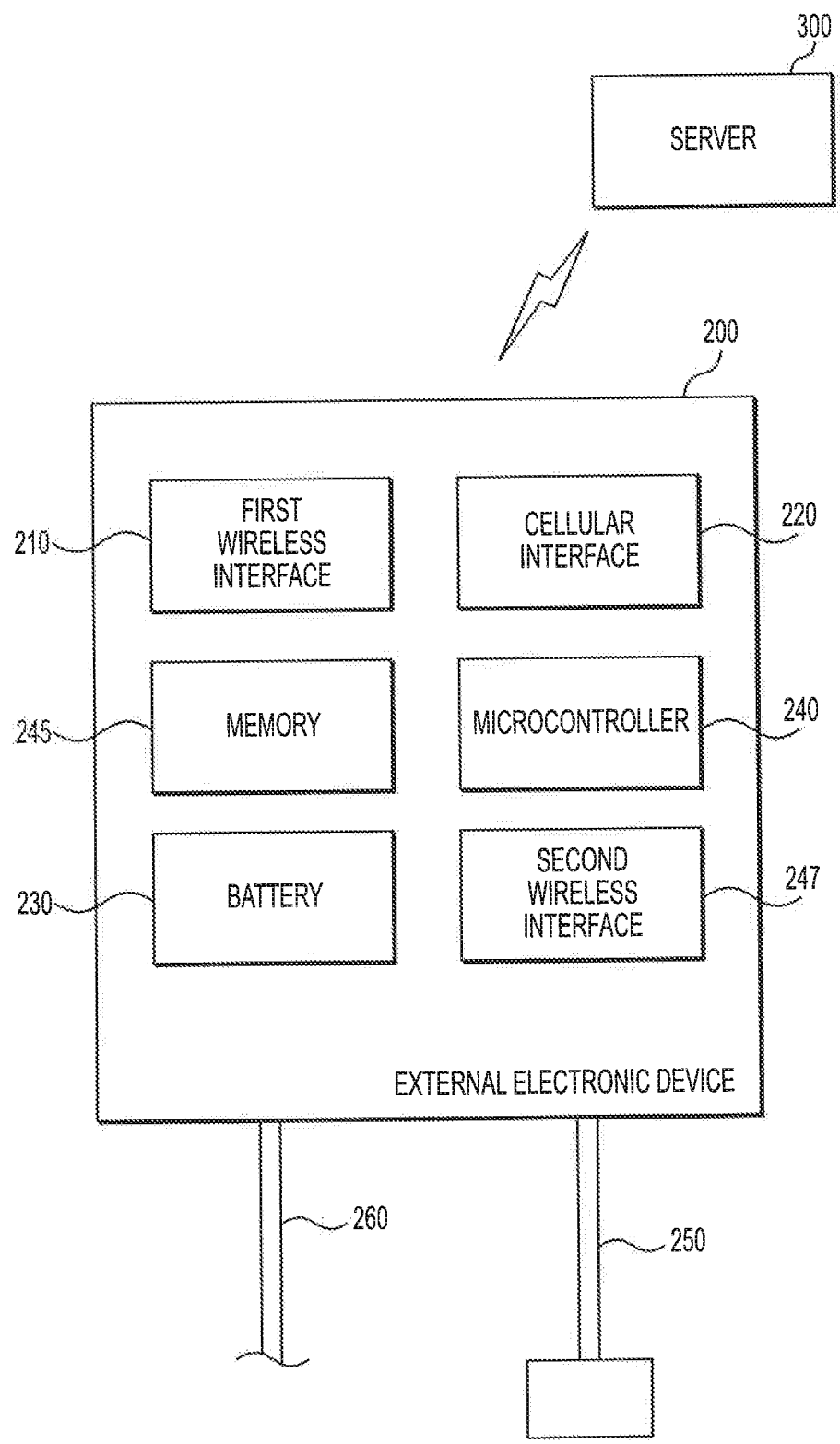
FIG. 3 is a schematic diagram of an Aircraft Connectivity Module (ACM) of FIG. 2.
Figure 4:
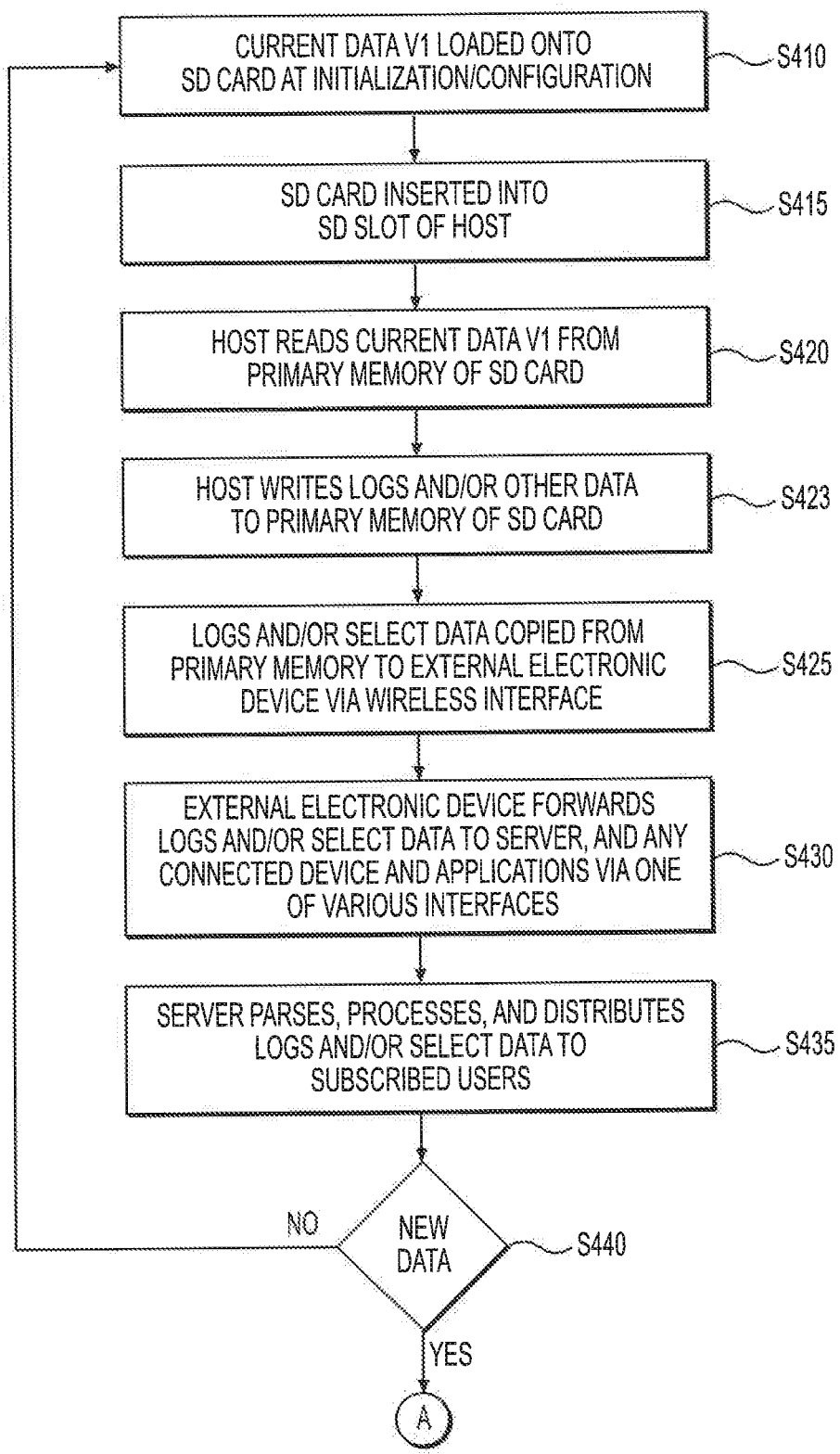
FIG. 4 is a flow chart of a method for updating flight data using a dual memory SD card according to an embodiment.
Figure 4:
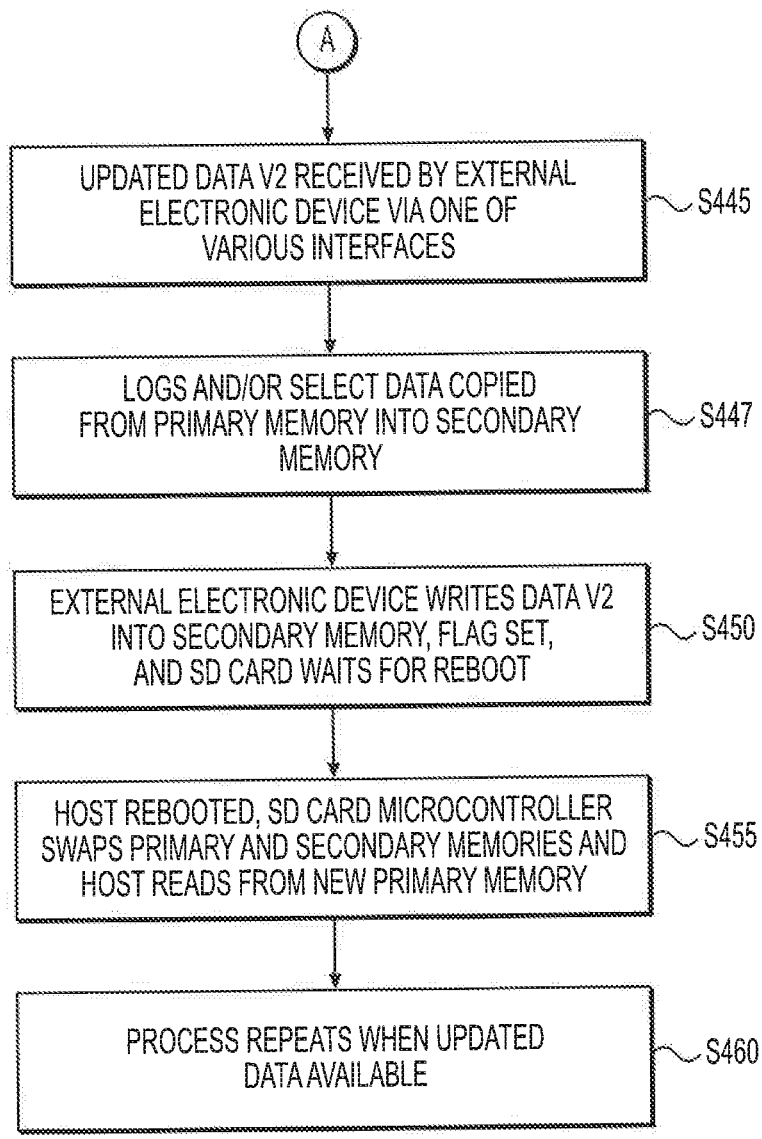
Figure 5:
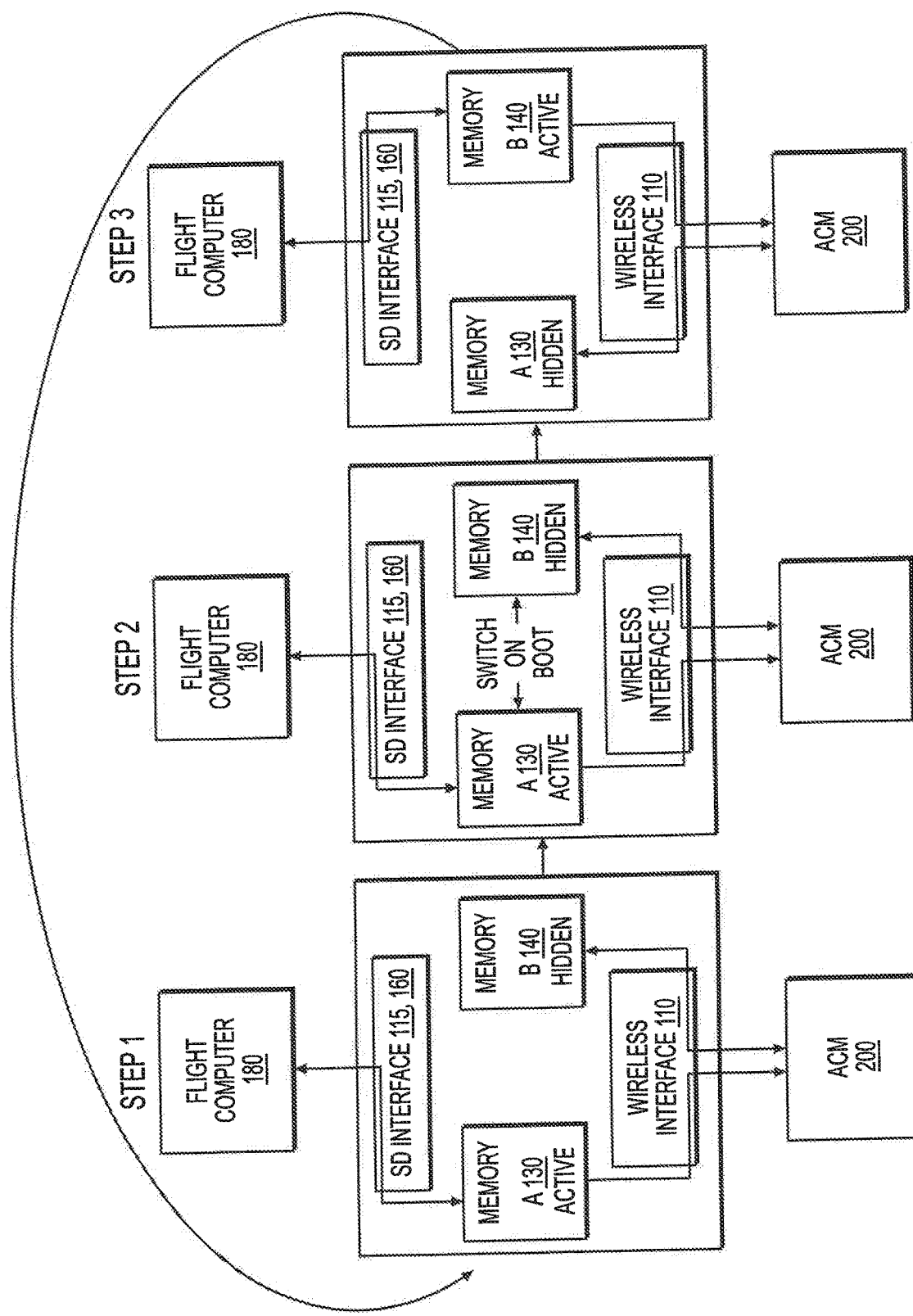
FIG. 5 is a schematic diagram illustrating data flow in the system and method for updating flight data using a dual memory SD card according to embodiments.

FIG. 1 is a schematic diagram of a dual memory SD card according to an embodiment. FIG. 2 is a schematic diagram of a system for updating flight data using a dual memory SD card according to an embodiment. FIG. 3 is a schematic diagram of an Aircraft Connectivity Module (ACM) of FIG. 2. FIG. 4 is a flow chart of a method for updating flight data using a dual memory SD card according to an embodiment. FIG. 5 is a schematic diagram illustrating data flow in the system and method for updating flight data according to embodiments.

Referring to FIGS. 1-2, the dual memory SD card 100 according to embodiments includes a novel SD card configured to be inserted into a host electronic device 180 (hereinafter "host"), such as a host computer with an SD card slot 190. The host 180 may be, for example, a flight computer in an aircraft. The SD card 100 may include a wireless interface 110, a memory A 130, a memory B 140, and a microcontroller (or microprocessor or Application Specific Integrated Circuit (ASIC) chip) 150. The dual memory SD card 100 may further include an SD card compatible circuit board 100a, a SD memory and pin interface controller 115, and a standard SD pin interface 160.

The SD memory and pin interface controller 115 may be a standard memory controller used in SD cards to control interface of the host and the SD memory. The dual memory SD card 100 according to embodiments, in addition to standard SD components, includes two memories, the memory A 130 and the memory B 140, as well as the microcontroller or ASIC 150. Memory A 130 and memory B 140 may be two distinct physical memories, or two virtual memories implemented on the same physical memory chip. The memory A 130 and the memory B140 selectively function as primary and secondary memories, as discussed hereinafter, and the microcontroller or ASIC 150 manages data flow in the dual memory SD card 100 and memory access, as discussed herein after.

A system 5 for updating flight data using a dual memory SD card according to embodiments may include the dual memory SD card 100, the host 180 (flight computer), and an external electronic device 200. The external electronic device may be, for example, an aircraft connectivity module (ACM).

As shown in FIG. 3, the external electronic device (ACM) 200 may include a memory 245, a microcontroller (or microprocessor) 240, a battery 230, a first wireless interface 210, a cellular interface 220, a second wireless interface 247, a USB or Ethernet port 250, and an external power input 260. The ACM 200 may be configured to be located within communication range of a host 180, for example, an avionics panel in an aircraft.

The first wireless interface 210 may be, for example, a Wi-Fi radio. The second wireless interface 247 may be, for example, a Bluetooth module. The ACM 200 may read data from aircraft avionics and display the data in real time via the wireless interface 247 to any connected device and applications on the aircraft. The ACM 200 may also send data during flight or upon landing to a remote (Internet-based) server 300.

As set forth above, the dual memory SD card 100 includes two memories, the memory A 130 and the memory B 140. At any given point in time only one of the memories is a primary memory and visible to the host 180, and an address of that primary memory is updated by the microcontroller or ASIC 150 to be the starting memory address read by the host 180. The external electronic device 200, such as the ACM, may be connected to the wireless interface 110 to read data from the primary memory, that is, the memory A 130 in this case, but cannot write to it, while the host 180 may be connected via the SD pin interface 160 and both read from and write to the primary memory, that is, the memory A 130. The host 180 may read data from and write data to the primary memory, that is, the memory A 130. The other memory, that is, the memory B 140 in this case, is the secondary memory and is only visible to a predetermined external electronic device, such as, the nearby ACM 200, which can both read from and write to this memory. The external electronic device writes updates into the secondary memory and may also write a copy of all the existing data (logs and files) that it read from the primary memory, that is, the memory A 130. When a new version of the data (databases or files) has been loaded into the secondary memory, that is, the memory B 140 in this case, a flag may be set by the microcontroller or ASIC 150 and the secondary memory, that is, the memory B 140, becomes the primary memory, and vice-versa, the memory A 130 becomes the secondary memory, upon the next reboot of the SD card system 5 (host 180). This is accomplished by the microcontroller or ASIC 150 swapping the memory start addresses of the two memories.

Referring to FIGS. 1-5, an automated flight data update system and method according to an embodiment with a flight computer that uses an SD card interface for its flight data will be described hereinafter. In particular, FIG. 4 is a flow chart of a method for updating flight data (databases) using a dual memory SD card according to embodiments, while FIG. 5 is a schematic diagram illustrating data flow in the system and method for updating flight data using a dual memory SD card according to embodiments.

Referring to FIG. 4, host 180, such as a flight or avionics computer in an aircraft, receives SD card 100 plugged into SD slot 190 (S415). The SD card 100 contains a current version of flight data V1 in its primary memory, that is, memory A 130, in this case, loaded onto the SD card 100 at initialization/configuration (S410). The host 180 reads the current version of the flight data V1 from the memory A 130, including navigation data (S420), and writes flight logs and/or other data to the memory A 130 via microcontroller or ASIC 150 and/or SD memory and pin interface controller 115 (S423). The flight logs and/or select data are copied from the primary memory, that is, the memory A 130, to ACM 200 via wireless interfaces 110, 210 (S425). The ACM 200 may display the data in real time via wireless interface 247 to any connected devices and apps on the aircraft, and also forward the flight logs and/or select data during flight or upon landing to a remote (Internet-based) server 300 for distribution to connected devices (S430). The server 300 may parse, process, and distribute the flight logs and/or select data to subscribed users (S435).

At S440, the system 5/method checks for new data. The ACM 200 is located within communication range of host 180, receives flight data V2 updates wirelessly from the server 300 (S445) via cellular interface 220 or wireless interface 210, for example, and stores the flight data V2 updates in memory 245 via microcontroller 240 all powered by battery 230 which is charged by USB input 250 or external power input 260. The ACM 200 then transmits/writes the updated flight data V2 from the memory 245 to the secondary memory, that is, memory B 140, of the SD card 100 via wireless interface 210 and wireless interface 110. As the files are received by the SD card 100 through the wireless interface 110, the microcontroller or ASIC 150 streams the update flight data V2 into the secondary memory, that is, the memory B 140 in this case; once a complete set of updated flight data V2 is loaded into the secondary memory, that is, the memory B 140 in this case, the microcontroller or ASIC 150 may set a flag indicating that the updated flight data V2 is ready for transfer to the host 180, and the system 5 waits for reboot (of host 180) (S450).

A copy of all current flight logs and/or select data read from the memory A 130 may also be inserted into the secondary memory, that is, the memory B 140, so they will remain accessible by the host 180 (S447). The next time the aircraft powers up and the host 180 begins booting up, the microcontroller or ASIC 150 sets the primary memory address to the memory B 140 effectively swapping the primary and secondary memories (S455). The host 180 now reads the updated flight data V2 via the SD card interface 160 which is plugged into and connected in the SD slot 190. The new data (databases) is loaded into the flight computer memory and is now used by navigation and display equipment on the aircraft. All previous flight logs are also available in the new primary memory, memory B 140, to the flight computer or external devices. No manual or pilot interaction is required during this whole process. This process repeats when updated data is available (S460).

Figure 6:
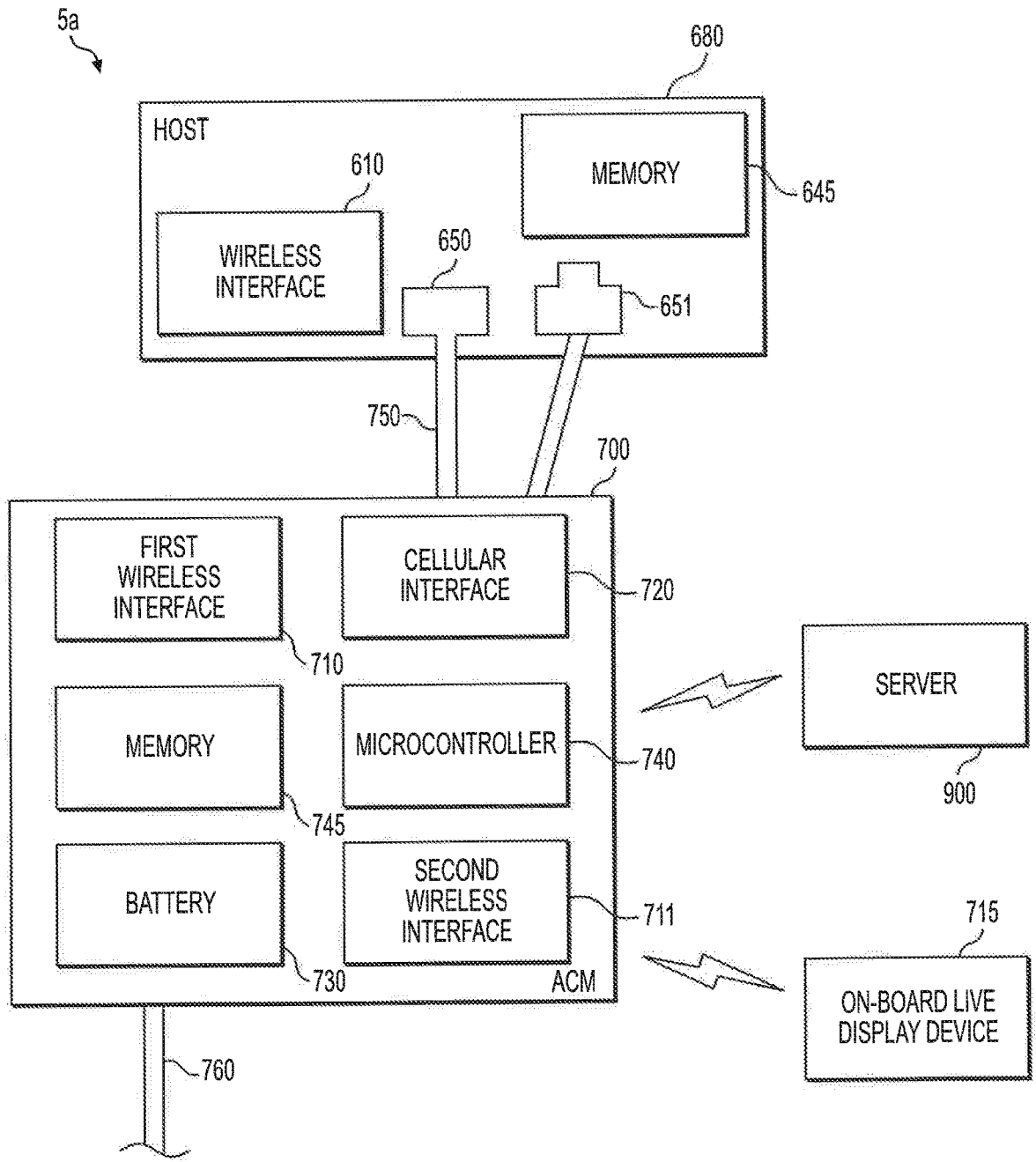
FIG. 6 is a schematic diagram of a system for updating flight data according to another embodiment.
Figure 7:
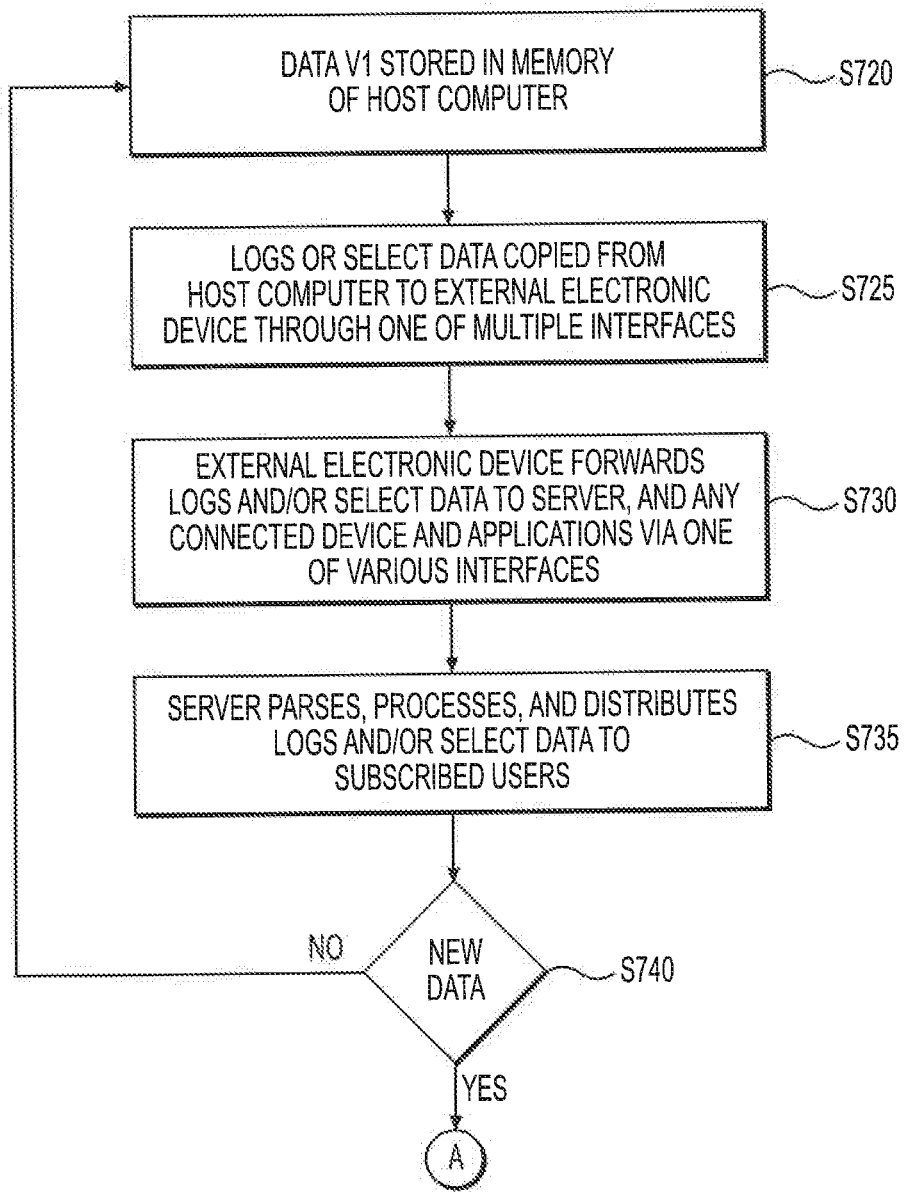
FIG. 7 is a flow chart of a method for updating flight data according to another embodiment.
Figure 7:
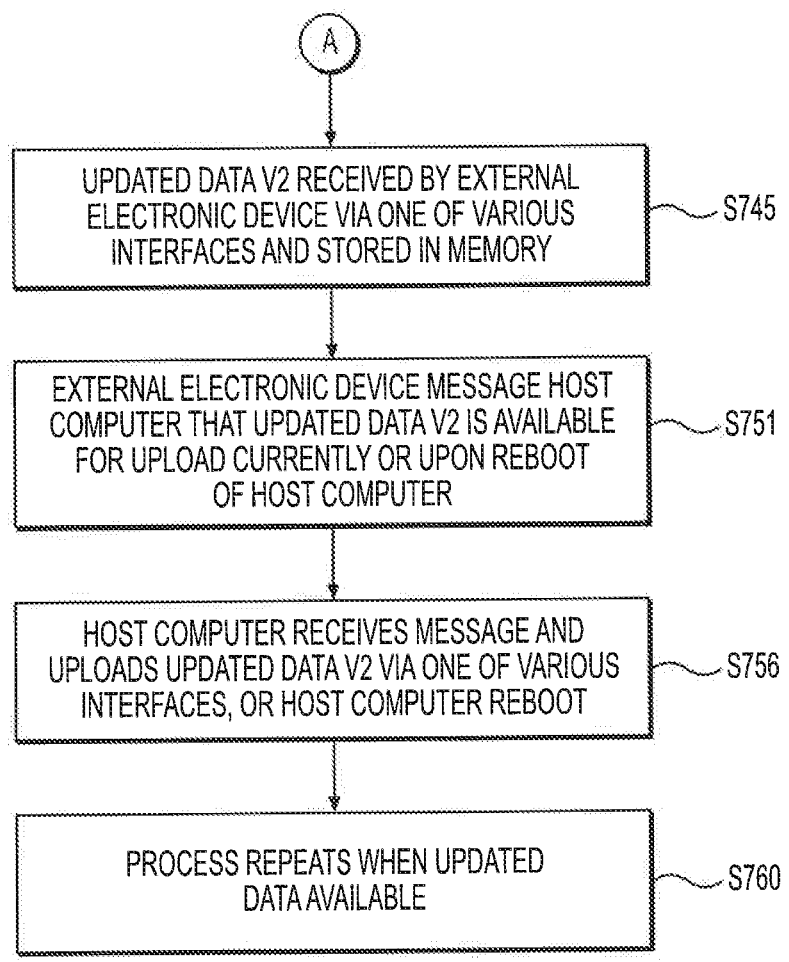

FIG. 6 and FIG. 7 show, respectively, a system and method for updating flight data according to another embodiment with a host (avionics computer) that uses a USB/Ethernet/Wi-Fi interface for its flight data interface. That is, FIG. 6 is a schematic diagram of a system for updating flight data according to another embodiment, while FIG. 7 is a flow chart of a method for updating flight data according to another embodiment. Similar to the previous embodiments, the system and method according to this embodiment are implemented to wirelessly and automatically update flight data in an avionics computer (host computer) in an aircraft. However, embodiments are not limited thereto. For example, the system and method according to this embodiment may be utilized in other types of systems, such as a vehicle computer in an automobile or other vehicle, or an industrial computer running industrial equipment.

The system 5a for updating flight data shown in FIG. 6 may include host 680, for example, an avionics computer, and external electronic device 700, for example, an ACM. The host 680 may include a memory 645, and an interface, such as a wireless interface 610, a USB interface 650, or an Ethernet interface 651, for example, among other known interfaces, and other known components. The ACM 700 may include a microcontroller (or microprocessor) 740, a memory 745, a battery 730, and/or an external power input 760. The ACM 700 may further include a plurality of interfaces, such as a first wireless interface 710, such as a wireless radio, a second wireless interface 711, and a cellular interface 720, for example. The ACM 700 may be configured for wireless communication with a remote (Internet-based) server 900 and a secondary external electronic device or on-board live display device 715, such as a smart phone, tablet computer, or display monitor, for example.

As set forth above, the host 680 may be an avionics computer in an aircraft and may have a current version of flight data V1 loaded into memory 645 (S720). The USB interface 650 and/or Ethernet interface 651 and/or wireless interface 610 may be provided for data transfers with external electronic devices. For example, the ACM 700 may read and forward flight logs and/or select data from the host 680 via the USB interface 650 and/or Ethernet interface 651 and/or wireless interface 610 (S725) and forward them to the server 900 (and the on-board live display device 715) via cellular or satellite interface 720 or one of the first and second wireless interfaces 710, 711 (S730). The server 900 may parse, process, and distribute flight logs and/or select data to subscribed users (S735).

At S740, the system 5a/method checks for new data. The ACM 700 may receive wirelessly updated data from the server 900 and store the updated data in memory 745 via microcontroller 740 all powered by battery 730, which is charged by USB input 750, or external power input 760 (S745). When a new version of flight data V2 has been fully loaded into memory 745, microcontroller 740 may send a message to the host 680 via a prespecified protocol (S751), and the updated flight data V2 may be transferred to memory 645 of host 680 (S751, S756). Alternately, the updated flight data received by the ACM 700 may be transferred upon reboot of host 680 via a second predetermined protocol in which host 680 searches for new data updates from its connected devices upon booting up (S751, S756). This process repeats when updated data is available (S760).

Embodiments disclosed herein provide a special purpose SD card that has a standard SD pin interface, along with a second backdoor interface, such as Wi-Fi or Bluetooth, and two separate memories (physical or virtual) which may be managed and independently accessible by at least two different external devices connected via the interfaces. Embodiments disclosed herein further provide a system to automatically transmit flight database updates from an Internet server to a flight computer on an aircraft, the flight computer having an SD card slot and reading an inserted SD card to update its flight databases. Embodiments disclosed herein furthermore provide a system to automatically transmit flight database updates from an Internet server to a flight computer on an aircraft, the flight computer having external interfaces, such as a USB, Ethernet, or Wi-Fi connection and communicating to an external device across the interfaces to update its flight databases.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A Secure Digital (SD) card configured to provide automatic and wireless updates of data from and to an external electronic device while simultaneously operating in a SD interface of a host electronic device, the SD card comprising:
    an SD card circuit board with a SD pin interface;
    an SD memory and pin interface controller configured to control transfer of data between the SD card and the host electronic device;
    a wireless interface configured to communicate with the external electronic device;
    a primary memory that stores data, wherein the primary memory can be read from and written to by the host electronic device connected via the SD pin interface, but only read from by the external electronic device connected via the wireless interface;
    a secondary memory that stores data, wherein the secondary memory is not accessible to the host electronic device but can be read from and written to by the external electronic device; and
    a microcontroller or Application Specific Integrated Circuit (ASIC) that manages data flow and memory access.

2. The SD card of claim 1, wherein the primary memory is configured to be read from and written to by the host electronic device connected via the SD pin interface, while the secondary memory is being read from and written to by the external electronic device through the wireless interface, wherein the external electronic device updates data in the secondary memory, and wherein the microcontroller or ASIC switches the primary memory and the secondary memory when the update is completed so that upon reboot of the host electronic device, the SD memory controller views the former secondary memory as the primary memory and connects that memory with the updated data to the host electronic device.

3. The SD card of claim 1, wherein the host electronic device is a flight computer in an aircraft, and wherein the external electronic device is an aircraft connectivity module (ACM).

4. A system for providing automatic and wireless updates of data from and to an external electronic device while simultaneously operating in a SD interface of a host electronic device, the system comprising:
- a host electronic device having a SD card interface;
- an external electronic device comprising a wireless interface; and
- an SD card configured to be coupled with the SD card interface of the host electronic device and to communicate with the external electronic device via the wireless interface, wherein the SD card comprises:
  - an SD card circuit board with a SD pin interface;
  - an SD memory controller configured to control transfer of data between the SD card and the host electronic device;
  - a wireless interface configured to communicate with the external electronic device;
  - a primary memory that stores data, wherein the primary memory can be read from and written to by the host electronic device connected via the SD pin interface, but only read from by the external electronic device connected via the wireless interface;
  - a secondary memory that stores updated data, wherein the secondary memory is not accessible to the host electronic device but can be read from and written to by the external electronic device; and
  - a microcontroller or Application Specific Integrated Circuit (ASIC) that manages data flow and memory access.

5. The system of claim 4, wherein the primary memory is configured to be read from and written to by the host electronic device connected via the SD pin interface, while the secondary memory is being read from and written to by the external electronic device through the wireless interface, wherein the external electronic device updates data in the secondary memory, and wherein the microcontroller switches the primary memory and the secondary memory when the update is completed so that upon reboot of the host electronic device, the SD memory controller views the former secondary memory as the primary memory and connects that memory with the updated data to the host electronic device.

6. The system of claim 5, wherein the external electronic device copies select data from the primary memory for which it has read access to the secondary memory for which it has write access as part of the update in order to make that select data available in the new primary memory after the update.

7. The system of claim 4, wherein the host electronic device is a flight computer or avionics panel in an aircraft, and wherein the external electronic device is an aircraft connectivity module (ACM).

8. The system of claim 7, wherein the data comprises flight data including flight plans, navigational data and/or flight logs.

9. The system of claim 7, wherein the ACM provides the flight data to an Internet server via a second wireless interface and/or a satellite and/or a cellular interface and receives updated flight data from the server.

10. A method for automatically updating data in a host computer which contains an SD card, the SD card configured to automatically and wirelessly provide updates of data from and to an external electronic device while simultaneously operating in a SD interface of a host electronic device, the method comprising:
- receiving updated data to an external electronic device from a server via a first wireless interface;
- loading the updated data into a secondary memory of the SD card via the external electronic device via a secondary wireless interface;
- swapping via a microcontroller or Application Specific Integrated Circuit (ASIC) of the SD card the secondary memory and a primary memory of the SD card at a reboot of the host electronic device such that the host electronic device reads the updated data.

11. The method of claim 10, wherein the host electronic computer is one of an avionics computer on board an aircraft, a vehicle computer inside an automobile or other vehicle, or an industrial computer running industrial equipment.

12. The method of claim 10, wherein the host electronic computer is an avionics computer on board an aircraft, and wherein the external electronic device is an Aircraft Connectivity Module (ACM).

13. The method of claim 12, wherein the first wireless connection is one of a cellular connection, a wireless connection, a satellite connection, or a radio connection.

14. The method of claim 10, wherein the data comprises flight data including flight plans, navigational data and/or flight logs.

* * * * *